March 8, 1955  D. R. DE BOISBLANC  2,703,493
FLOWMETER

Filed Dec. 19, 1949  2 Sheets-Sheet 1

INVENTOR.
D. R. DE BOISBLANC
BY Hudson & Young
ATTORNEYS

March 8, 1955   D. R. DE BOISBLANC   2,703,493
FLOWMETER

Filed Dec. 19, 1949   2 Sheets-Sheet 2

INVENTOR.
D. R. DE BOISBLANC

BY Hudson & Young
ATTORNEYS

United States Patent Office 2,703,493
Patented Mar. 8, 1955

2,703,493

FLOWMETER

Deslonde R. de Boisblanc, Bartlesville, Okla., assignor to Phillips Petroleum Company, a corporation of Delaware Application December 19, 1949, Serial No. 133,838

9 Claims. (Cl. 73—194)

This invention relates to flowmeters.

Heretofore, considerable difficulty has been experienced in accurately measuring the rate of flow of fluid through a conduit. In one common type of flowmeter, the conduit through which the fluid passes is restricted, and the fluid pressure is measured both upstream and downstream from the constriction, the difference in pressure being a function of the flow rate. This method involves the placing of a substantial restriction in the path of flow, and considerable computation is necessary to determine the actual flow rate from the measured data. Various types of flowmeters have been devised to overcome the difficulties attendant upon the use of a constriction in the conduit. However, most of these are dependent upon the maintenance of streamline flow conditions in the conduit, and require apparatus which is rather bulky and critical in operation. Moreover, in most cases, complicated calibrating steps or computations are required to transform the measured data into actual flow rates.

It is an object of my invention to provide a novel flowmeter to overcome the disadvantages of prior art flowmeters.

It is a further object to provide a flowmeter which measures directly the average flow velocity, whether the flow conditions in the conduit be streamline or turbulent.

It is a still further object to provide a flowmeter which is simple in construction, reliable in operation, and will withstand adverse conditions very readily.

Various other objects, advantages, and features of the invention will become apparent from the following detailed description taken in conjunction with the accompanying drawings, in which.

Figure 1:
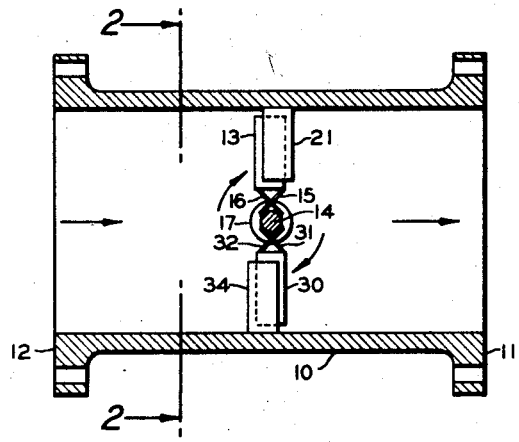
Figure 1 is a vertical, sectional view of the flowmeter of my invention.

Referring now to the drawings in detail, the flowmeter may include a conduit section 10 provided with flanges 11, 12 for insertion into the line through which flows the fluid whose velocity is to be determined. A thin flat metal plate 13 is resiliently mounted upon a support 14 which, in the example shown, is a shaft extending diametrically through the conduit. To this end, the plate and shaft are interconnected by crossed flexure plate hinges 15, 16 which permit plate 13 to be deflected in a plane perpendicular to the shaft but prevent displacement thereof in a lateral direction. The shaft 14 is journalled in suitable bearings 17, 18 which are sealed to prevent leakage of fluid from the conduit, and the shaft is driven by a motor 19 of the variable speed type.

In accordance with one modification of the invention, the plate 13 is moved through the fluid by shaft 14 when the fluid is stationary. The viscous drag of the stationary fluid upon the plate produces a deflection thereof which is measured in any suitable manner. In the example shown, the deflection of plate 13 is measured by determining its capacitance with respect to a stationary plate 21 secured to the conduit section 10 so that it is closely spaced and parallel to plate 13 when it is positioned in a direction normal to the path of fluid flow. Preferably, but not necessarily, a second plate 22 is symmetrically mounted upon the conduit section 12 at the other side of movable plate 13. Plates 21 and 22 are grounded by a conductor 52 connected to conduit 10. Plate 13 is connected by a suitable conductor, not shown, to a commutator device 24 with which coacts a brush 25 and a capacitance measuring instrument 50 which is described hereinafter. It will be apparent that angular movement of plate 13 about shaft 14 due to viscous drag of the fluid on the plate will produce a change in capacitance between movable plate 13 and stationary plates 21, 22. The commutator device 24 functions to connect the capacitance measuring instrument 50 to the plates at a predetermined part of each cycle of revolution of the motor. Preferably, the instrument is so connected when the plates 13, 21 and 22 are all positioned in side by side relationship. Accordingly, deflection of plate 13 by the viscous drag of the fluid thereon produces a change in the normal capacitance between the plates so that instrument 50 indicates directly the deflection of plate 13.

When the fluid is moved through the conduit, it will be evident that the viscous drag upon plate 13, which is proportional to the relative velocity of movement of the fluid past the plate, will be decreased since the fluid and plate are moving in the same direction when plate 13 is positioned between plates 21 and 22. The speed of rotation of motor 19 is then decreased until the deflection of plate 13, as indicated by instrument 50, is the same as when the fluid was stationary. The decrease in speed of rotation of the motor as indicated by tachometer 53 is then a direct indication of the flow velocity of the fluid in the conduit. It is a feature of the invention that the measured flow is the average fluid velocity through the conduit. This arises from the fact that plate 13 extends substantially from the center of the conduit to the inner edge of conduit section 10. As a result, an integrating effect is obtained which results in an averaging of the flow velocities at the center and periphery of the conduit in such manner as to produce a reading indicative of average flow through the conduit.

It will be apparent that my novel flowmeter operates in the same manner when the direction of flow through the conduit is reversed. In this case, however, the viscous drag upon plate 13 is increased rather than decreased when fluid flow through the conduit is initiated. Therefore, in this case it is necessary to increase the motor speed rather than decrease it in order to produce the same deflection of plate 13 when fluid is flowing through the conduit as is produced when the fluid is stationary, this increase in motor speed being a direct indication of the average flow velocity in the conduit.

In another modification of the invention, the motor may be operated at constant speed. In this case, as the fluid velocity is increased, the viscous drag upon plate 13 and, hence, its deflection is correspondingly decreased. This decrease in deflection produces a change in capacitance between plate 13 and plates 21, 22 which is a measure of fluid velocity.

In a preferred embodiment of the invention, I provide a thin flat plate 30 which is supported diametrically opposite plate 13 by crossed flexure plate hinges 31 and 32, this plate cooperating with stationary plates 33, 34 positioned diametrically opposite and symmetrically with respect to the plates 21 and 22. This provides a symmetrical balanced system, and enables the flow rates throughout substantially the whole diameter of the conduit to be integrated. Thus, as the velocity profile is different in the bottom portion of the conduit, this different velocity profile will be automatically compensated for by the second set of plates. When the second set of plates is utilized, an additional commutator 46 having brush 27 making contact therewith is provided on shaft 14, said commutator 46 being connected by a suitable lead, not shown to plate 30. In this arrangement the two capacitances are compared with one another by means of the bridge circuit comprising balancing resistors 28 and 29, voltage source 51, and meter 50. The alternating current voltage source 51, one terminal of which is grounded, is applied across opposite corners of the bridge arrangement, the stationary plates 21, 22, 33 and 34 also being grounded by lead 52; and the unbalance of the bridge created by differences in capacitance between the upper and lower plates is indicated on meter 50. The magnitude of this unbalance is an indication of the velocity of fluid within conduit 10.

Figure 2:
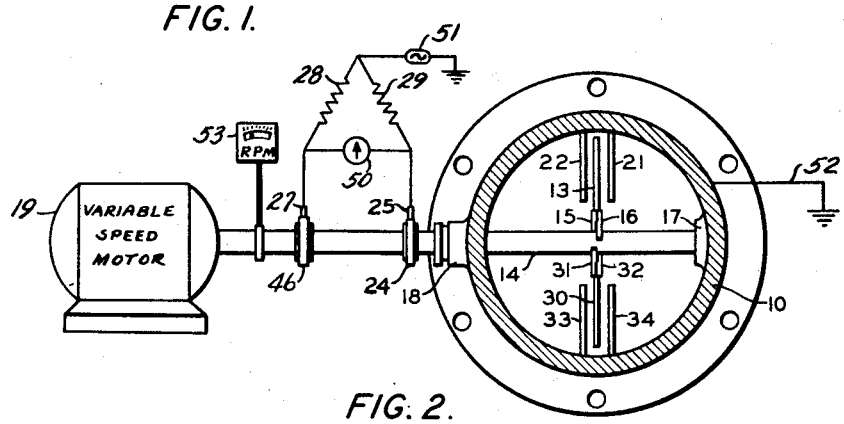
Figure 2 is a sectional view taken along the line 2—2 of Figure 1.
Figure 3:
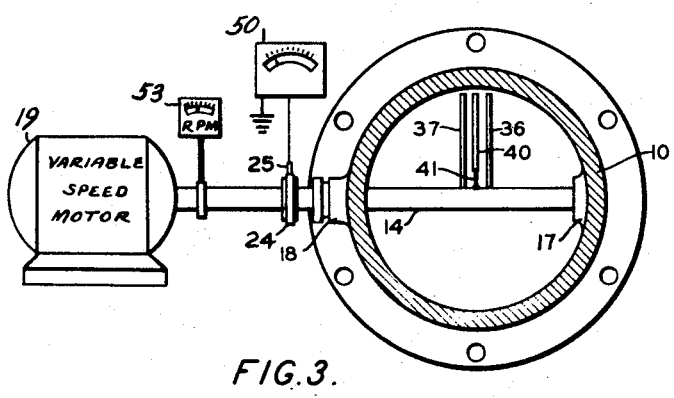
Figure 3 is a horizontal, sectional view of a modified type of flowmeter.

The modification of Figure 3 is generally similar to that of Figures 1 and 2, and corresponding parts are indicated by like reference characters. In this modification, the "stationary" or reference plates 36 and 37 are carried by the shaft and rotate therewith, and a thin flat plate 40 is mounted between and parallel to plates 36, 37 by a spring wire 41. It will be apparent that deflection of plate 40 in an angular direction of the shaft will change the capacitance between this plate and the set of plates 36, 37 in a manner similar to that described in connection with Figure 2. As illustrated in Figure 3 meter 50 is intended to include the bridge measuring circuit of Figure 2 wherein a capacitor corresponding to the capacitance between plates 33, 34 and 30 is provided by a standard capacitor, not shown. The operation of this embodiment is similar to that of Figures 1 and 2 in that plate 40 is rotated at a constant velocity as indicated on tachometer 53. The capacitance between plate 40 and plates 36, 37 at a preselected portion of the cycle is, therefore, a measurement of the velocity of the fluid under measurement.

Figure 4:
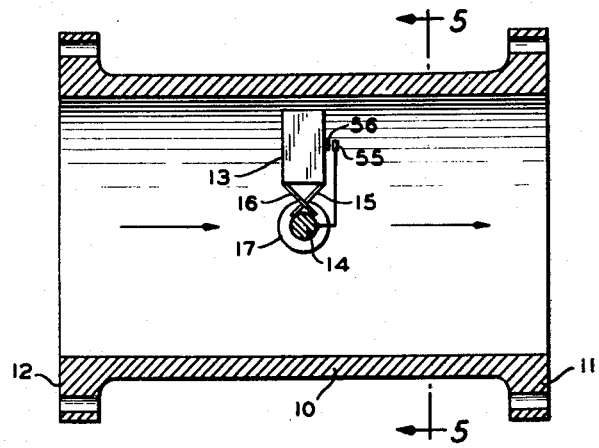
Figure 4 is a vertical sectional view of a modified type of flowmeter.
Figure 5:
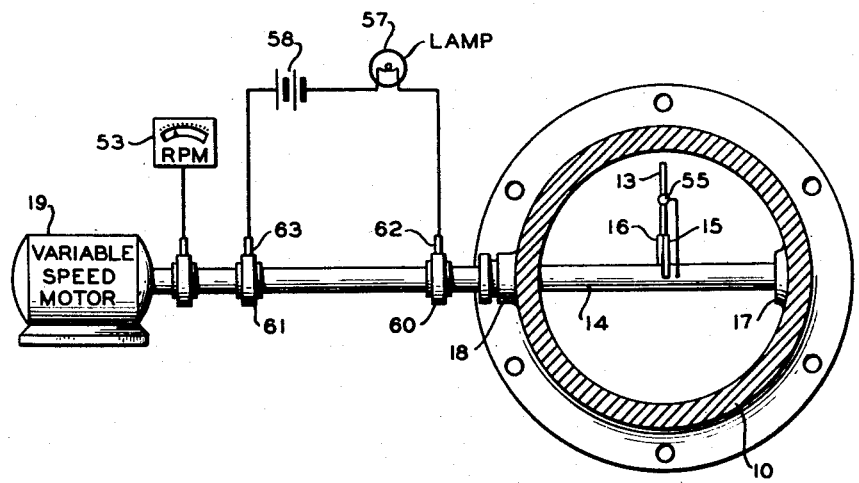
Figure 5 is a sectional view taken along the lines 5—5 of Figure 4.

It is to be understood that the measurement of plate deflection by capacitance is not an essential feature of the invention, although it is important in obtaining the best results with my novel flowmeter. It is within the scope of the invention to measure the deflection in any suitable manner. For example, see Figures 4 and 5, a contact 55 may be mounted on shaft 14 and a similar contact 56 may be mounted on plate 13, these contacts being closed when there is a predetermined deflection of plate 13 but being open when there is less than a predetermined deflection. In operating such a flowmeter, the motor speed is gradually increased with the liquid in stationary condition until the contacts 55 and 56 are closed to indicate a predetermined deflection of the plate. This closure can be indicated by a lamp 57 connected in circuit with a battery 58 and contacts 55 and 56. This circuit is completed by leads, not shown, which are attached to respective contacts 55 and 56 and to respective slip rings 60 and 61. Brushes 62 and 63 engage respective slip rings 60 and 61. When the fluid flows through the conduit in the direction illustrated in Figure 4 contacts 55 and 56 tend to close when plate 13 is in the upper half of the conduit because of the viscous drag of the flowing fluid on plate 13 which tends to displace contact 56 into engagement with contact 55. During the second half cycle of rotation when plate 13 is in the lower half of the conduit, there is less tendency for contact 56 to engage contact 55 because the viscous drag of flowing fluid on plate 13 tends to retain the two contacts apart. Thus when the velocity of plate 13 is increased to a value sufficient to cause contacts 55 and 56 to become engaged when plate 13 is in the upper half of the conduit lamp 57 in turned off and on periodically. The difference in motor speeds necessary to cause initial engagement of the two contacts with a fluid flow and without a fluid flow is a direct indication of the average flow velocity through the conduit.

While the invention has been described in connection with a present, preferred embodiment thereof, it is to be understood that this description is illustrative only and is not intended to limit the invention, the scope of which is defined by the appended claims.

I claim:

1. In a flowmeter, in combination, a conduit for conveying a fluid whose velocity is to be measured, a rotatable shaft journalled within said conduit, a thin flat plate, means resiliently mounting said plate on said shaft so that said plate presents a thin edge surface to the fluid flowing through said conduit, a second thin metal plate mounted in a plane closely spaced to said first plate and parallel thereto forming an electrical condenser with said first plate, means for rotating said shaft to cause said first plate to move in a cyclic circular path through the fluid in said conduit in a direction longitudinal to said flow, as indicator responsive to changes in electrical capacitance between said first and second plates, and means for connecting said indicator to said plates during a predetermined part of each cycle.

2. In a flowmeter, in combination, a conduit for conveying a fluid whose velocity is to be measured, a rotatable shaft journalled within said conduit such that the longitudinal axis of said shaft is substantially perpendicular to the fluid flow through said conduit, a thin flat plate, means resiliently mounting said plate on said shaft for angular movement about said shaft so that said plate presents a thin edge surface to the fluid flowing through said conduit, a second thin metal plate mounted within said conduit in a plane closely spaced to said first plate and parallel thereto, means for rotating said shaft at variable speeds to cause said first plate to move in a cyclic circular path through the fluid in said conduit, an indicator responsive to changes in electrical capacitance between said first and second spaced plates, and means for connecting said indicator to said plates during a predetermined part of each cycle at which said plates are normally positioned in side by side relationship, movement of said first plate about its resilient mounting due to fluid flow producing a change in capacitance between said plates during said predetermined part of the cycle.

3. A flowmeter in accordance with claim 2 in which the second plate is mounted upon and secured to the conduit.

4. A flowmeter in accordance with claim 2 in which the second plate is mounted upon and secured to the shaft.

5. In a flowmeter, in combination, a conduit for conveying a fluid whose velocity is to be measured, a rotatable shaft journalled within said conduit such that the longitudinal axis of said shaft is substantially perpendicular to the fluid flow through said conduit, a thin flat plate, a flexure plate spring suspension mounting said plate on said shaft for angular movement about said shaft so that said plate presents a thin edge surface to the fluid flowing through said conduit, a second thin metal plate mounted within said conduit in a plane closely spaced to said first plate and parallel thereto, means for rotating said shaft at variable speeds to cause said first plate to move in a cyclic circular path through the fluid in said conduit, an indicator responsive to changes in electrical capacitance between said first and second spaced plates, and means for connecting said indicator to said plates during a predetermined part of each cycle at which said plates are normally positioned in side by side relationship, movement of said first plate about its resilient mounting due to fluid flow producing a change in capacitance between said plates during said predetermined part of the cycle.

6. In a flowmeter, in combination, a conduit for conveying a fluid whose velocity is to be measured, a shaft extending diametrically through said conduit, a first pair of thin flat metal plates, a set of spring suspension units mounting said plates at diametrically opposite positions on said shaft and in a plane perpendicular to said shaft, two pairs of thin closely spaced metal plates mounted at diametrically opposite portions of said conduit, each pair of said plates being adapted to receive between them, in succession, both of the movable plates carried by said shaft thereby forming electrical condensers, a motor for rotating said shaft to cause the plates carried by the shaft to cyclically and recurrently pass between said two pairs of plates, a capacitance measuring bridge circuit, first and second commutators mounted on said shaft to electrically connect respective ones of said first pair of plates to said bridge circuit during a period in each cycle when the plates carried by said shaft are positioned between said two pairs of plates.

7. In a flowmeter, in combination, a conduit for conveying a fluid whose velocity is to be measured, a shaft extending diametrically through said conduit, a first pair of thin flat metal plates, a set of spring suspension units mounting said plates at diametrically opposite positions on said shaft and in a plane perpendicular to said shaft, two pairs of thin closely spaced metal plates mounted on diametrically opposite portions of said conduits, electrical circuit means to maintain said two pair of plates at a point of reference potential, each pair of said plates being adapted to receive between them both of the movable plates carried by said shaft thereby forming electrical condensers, all of said plates extending substantially from said shaft to the inner wall of said conduit, a motor for rotating said shaft to cause the plates carried by the shaft to cyclically and recurrently pass between said two pairs of plates, a capacitance measuring circuit including first and second resistors having first end terminals thereof connected to one another, a source of alternating current applied between said first terminals and said point of reference potential, a current indicating device connected between the second end terminals of said first and second resistors, and first and second commutators mounted on said shaft for connecting respective ones of said first pair of plates to respective second end terminals of said first and second resistors during a period in each cycle when the plates carried by said shaft are positioned between said two pairs of plates.

8. A flowmeter comprising, in combination; a conduit to define a fluid flow path; a shaft rotatably mounted in said conduit whereby the axis of rotation of said shaft is substantially perpendicular to the direction of fluid flow through said conduit; a thin member having a flat surface; means resiliently connecting said member to said shaft within said conduit whereby said member extends radially with respect to said shaft so that said shaft and said member normally occupy first positions with respect to one another; variable speed means connected to said shaft to rotate said shaft about its axis to move said member within said conduit in a generally circular path, the plane of which is substantially perpendicular to the axis of said shaft whereby the plane of said flat surface of said member remains substantially parallel to the direction of fluid flow through said conduit; and means to indicate the relative positions of said member and said shaft, the deflection of said member from said first position with respect to said shaft being a function of the fluid velocity through said conduit.

9. The combination in accordance with claim 8 wherein said means for indicating the relative positions of said member and said shaft comprises a first contact attached to said shaft and spaced a predetermined distance from said member when said shaft and said member occupy said first positions, a second contact attached to said member, and means to indicate engagement of said contacts.

References Cited in the file of this patent

UNITED STATES PATENTS

| | | |
|---|---|---|
| 1,903,713 | Baule | Apr. 11, 1933 |
| 1,958,229 | Beech | May 8, 1934 |
| 2,344,331 | Swift et al. | Mar. 14, 1944 |
| 2,354,299 | Bays | July 25, 1944 |
| 2,575,492 | Dittmann | Nov. 20, 1951 |
| 2,587,174 | Lantz | Feb. 26, 1952 |